Oct. 16, 1934.  C. P. DEBUCH  1,977,117
PROCESS FOR THE SEPARATE RECOVERY OF VOLATILE METALS, NONMETALS, OR
VOLATILE OR GASEOUS METALLIC OR NONMETALLIC COMPOUNDS
Filed March 14, 1933
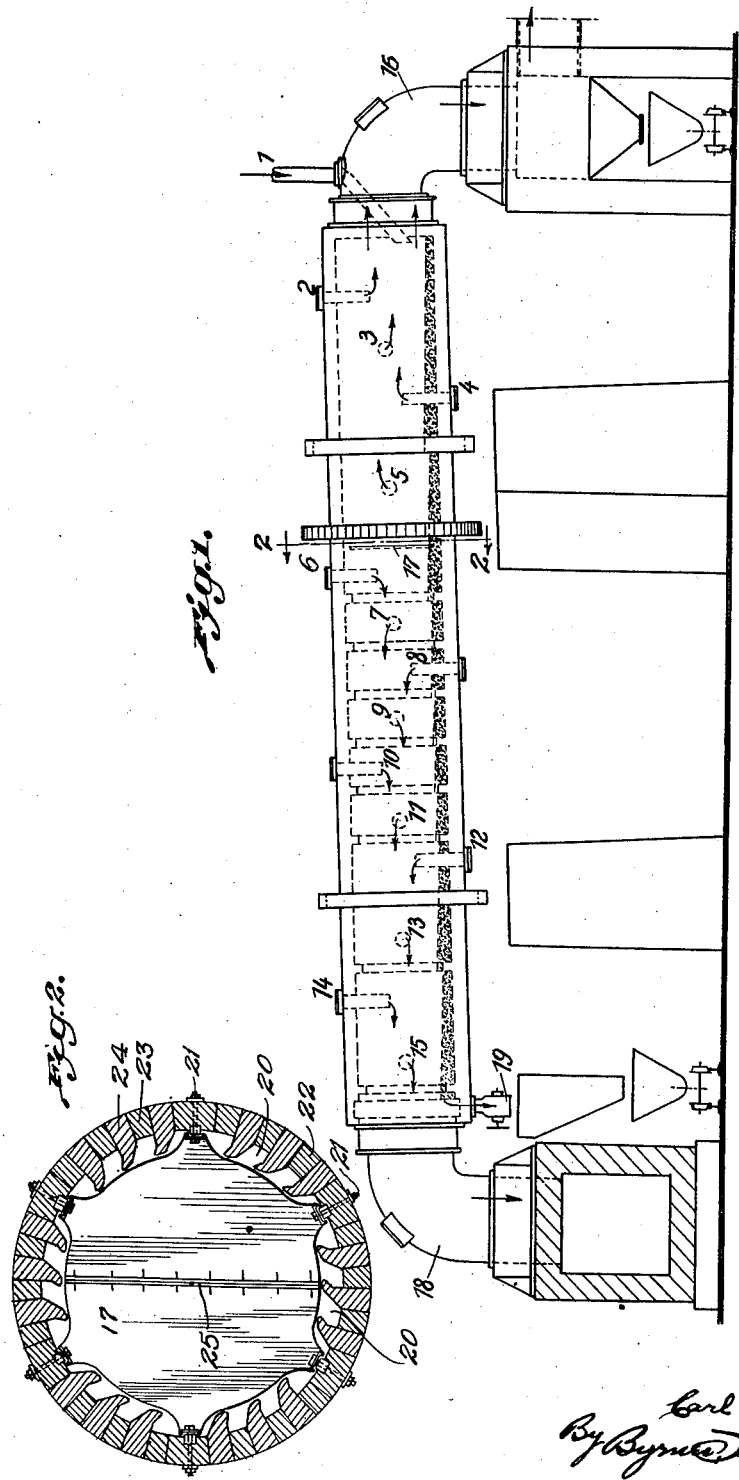
Inventor:
Carl Paul Debuch,
By Byrne Townsend & Potter,
Attorneys.

Patented Oct. 16, 1934

1,977,117

UNITED STATES PATENT OFFICE 1,977,117

PROCESS FOR THE SEPARATE RECOVERY OF VOLATILE METALS, NONMETALS, OR VOLATILE OR GASEOUS METALLIC OR NONMETALLIC COMPOUNDS

Carl Paul Debuch, Frankfort-on-the-Main, Germany, assignor to American Lurgi Corporation, New York, N. Y., a corporation of New York Application March 14, 1933, Serial No. 660,746
In Germany January 2, 1932

14 Claims. (Cl. 75—17)

This invention relates to a process for the separate recovery of volatile metals, non-metals, or volatile or gaseous metallic or non-metallic compounds and to an apparatus for use in carrying out said process.

In carrying out reactions in rotary-tube furnaces, volatile reaction products are frequently formed, the separation of which is desirable for many reasons.

In roasting arsenical pyrites, or a mixture of same and pyrites, the furnace gases contain, for example, sublimates of the various non-metals, especially sulphur, and oxides of same, such as $As_2O_3$, $As_2O_5$, $SO_2$, $SO_3$ and the like. A portion of these substances is condensed during the cooling of the gases, condensates of heterogeneous composition being obtained, such, for example, as crystalline and amorphous variations of the several arsenic compounds.

The condensates of compounds of arsenic and oxygen are extremely troublesome and also of low value, occurring partly in the form of dry dust, but sometimes—according to the thermal conditions—also of a hard vitreous or viscid character. In addition to the operative difficulties caused by these products, their necessary removal from the furnace and condensing plants may result in considerable danger and injury to the health of the operatives.

It has been ascertained that the roasting of arsenical pyrites proceeds in such a manner that, for example in treating arsenical pyrites containing 12 to 15% of arsenic and 22 to 25% of sulphur, all the arsenic except for a residue of less than 1% is already eliminated from the pyrites in the first third of the furnace, whereas, in this section of the furnace, the actual roasting of the sulphur has hardly begun. The charge material still contains about 20% of sulphur, and it is only thereafter that the real stage of sulphur roasting commences.

Similar conditions also occur in the treatment of other materials, for example in the volatilization of readily volatile metals.

According to the present invention, charge materials of this kind are treated by causing them to pass through the furnace continuously and progressively in the one direction, while the readily volatile substances volatilized during the treatment in the first part of the furnace, are led away in the opposite direction to the charge at the charging end of the furnace. On the other hand, the substances that volatilize with difficulty and are liberated in the second and hotter zone of the furnace are led away in the same direction as the charge, at the opposite end of the furnace. The heat necessary for the treatment is generated directly by the volatilization reactions in the furnace, with or without additional direct heating of the charge.

Metals, non-metals and metallic sulphides have already been recovered by means of fractional volatilization. In such case, the crushed ores, in the form of their oxides or other reducible compounds, such as sulphates, were mixed with carbon and heated in a rotary-tube furnace similar to that used in the Leblanc soda process, or in an internally heated circular furnace. The furnace operation was, however, intermittent, and the fractional volatilization was effected by first heating the entire charge in the rotary-tube furnace to the volatilization temperature of the more readily volatile constituents. These having been completely expelled, all parts of the rotary-tube were uniformly raised to the temperature required for distilling off the next fraction, and so on. In this known process, two furnaces have also been already employed, or one furnace divided into two zones. The one zone, or one furnace, was then intended solely for pre-heating the charge, and the other solely for the volatilization. The working operation then consisted in employing the gases issuing from the hottest furnace or zone to heat the charge in the other furnace or zone. The furnace gases thus passed through both furnaces or zones in succession. Consequently it was never possible to lead two different constituents of the charge separately out of the rotary-tube furnace at the same time.

The present invention enables this intermittent operation to be transformed into a continuous process and, while operating in this manner, enables two currents of gas of different composition to be recovered from one and the same furnace, one of said currents containing the more readily volatile, and the other the less readily volatile, constituents given up by the charge material.

According to the process of the present invention, in roasting arsenical pyrites for example, the two stages of roasting, namely the roasting of the arsenic and the roasting of the sulphur, are carried out separately. In the first section of the furnace the temperature is kept down so low that, substantially, the arsenic alone is expelled from the pyrites and the furnace gases are drawn off in counterflow to the charge, while in the remaining section of the furnace the sulphur roasting is carried on under the conditions most favourable for that operation and with removal of the gases at the other end of the furnace, that is to say in the same direction of flow as that of the charge.

The furnace employed for the process of the present invention is a rotary-tube furnace of known type, provided, for the oxidizing volatilization, with nozzles distributed over the periphery and length of the furnace, for the admission of the reaction gases, such as oxygen, the furnace being equipped for the purposes of the invention with a gas-tight sealing head at each end. By regulating the pressure conditions the volatilization products can be led away through the gas outlets in said furnace heads, at both ends, so that the required separation of the furnace gases into two currents in the furnace can be effected at convenience. The admission nozzles for the reaction gases, such as air, are fitted with dampers, and by varying the setting of these dampers larger or smaller separate currents of air can be admitted through the nozzles at convenient points in the furnace, or distributed over its entire length. When, for a given charge material, the point in the furnace at which the one reaction of volatilization ceases and the other begins has been ascertained, the establishment of the neutral zone required for the flow of gas at that point can be facilitated by reducing the cross-section of the furnace at that point, so as to afford a passage for the ore, but restrict that of the furnace gas. The separate transference of the products of different volatility in the two currents of gas can also be favourably influenced by admitting a portion of the gases needed for carrying out the fractional volatilization—for example roasting—at the point in the furnace where the currents of gas flowing towards the two ends of the furnace have their origin.

The course of the process will now be described with reference to the roasting of arsenical pyrites, and in order more clearly to understand the nature of the invention, reference is made to the accompanying drawing, in which Fig. 1 illustrates diagrammatically and in front elevation, by way of example, a typical embodiment of apparatus for roasting arsenical pyrites and in which Fig. 2 is a cross sectional view, at line 2—2, of the furnace illustrated in Fig. 1, showing the disposition of partition 17 with respect to the furnace wall.

In said drawing:—

The ore containing arsenic and sulphur is charged into the furnace at the point 1. In the first (upper) section of the obliquely mounted furnace, the arsenic is burned off. The requisite air of combustion is admitted into the furnace through the nozzles 2, 3, 4 and 5, and as indicated by the arrows, the furnace gases flow towards the gas outlet 16. The heated material passes under the partition 17 (shown in more detail in Fig. 2) into the second (lower) section, occupying about two-thirds of the total length of the furnace. The said partition consists, for example, of a plate of chromium steel or other heat-proof and non-corrosive material, firmly secured to the shell 22 or masonry of the furnace by suitable bolts 21. Its dimensions are such that sufficient space 20 for the passage of the material under treatment in the furnace remains between the periphery of the plate and the inner surface 23, 24, of the furnace masonry. For convenient installation of the partition 17 the latter may be divided as at 25 into two complementary sections, although this is in no wise a necessary expedient. In the second section of the furnace, the roasting air is admitted through the nozzles 6 to 15. In this section, the flow of gas is directed towards the lower head 18 for the outlet of the gases. The flow of furnace gases toward the gas outlet 16 on the one hand and the lower head 18 on the other hand is induced by means (not shown) for positively removing the gases at both heads of the furnace. The glowing ore passing under the partition 17 into the second section of the furnace still contains 20% of sulphur in the case of the present example, and accordingly the roasting reaction in the second section of the furnace still proceeds very energetically. The finished roasted ore is discharged from the furnace through the discharge device 19, of known type.

The process is also carried out in a similar manner when applied to all so-called mixed and complex ores with constituents whose volatilization temperatures differ in a manner analogous to those of arsenic and sulphur.

The process is also applicable to other metallurgical operations than roasting, for example to the volatilization of metals or metallic sulphides from ores, for example mercury, cadmium, zinc, or lead, or for the separation of metallic alloys. In such processes it is sometimes necessary to heat the furnace internally as well, in which case sulphides in dust form or fuels in solid, liquid or gaseous form can be employed in known manner, to generate the necessary heat. The fuels may either be introduced into the furnace along with the charge, or else the nozzles 2 to 5 and 6 to 15, or some of them, may be employed for admitting the fuel into the furnace together with air or other gases needed for working the furnace. On the other hand, it may be arranged for some of the nozzles to admit air or the like and others for the introduction of fuel, and of course the fuel can also be introduced through special auxiliary nozzles. Alternatively, a portion of the—for example gaseous or pulverized—fuel may be admitted through the nozzles and, for example, another portion such as small coal can be introduced in admixture with the charge material.

The advantages resulting from the treatment in accordance with the invention are divided into four different groups.

(1) Instead of a single current of gas containing all the volatilized constituents, or an intermittent current, the invention furnishes two continuous gas currents each of which is approximately homogeneous in composition and is therefore considerably more valuable for further treatment.

(2) The apparatus attached in connection with the further treatment or for utilizing the several volatilization products, are smaller, simpler and more reliable in operation. In roasting arsenical pyrites for example, the one current of gas is treated for the deposition of the arsenic, and the other for utilizing the $SO_2$. Moreover, each of these gas currents is relatively small in volume, so that the attached apparatus, such as the plant for cooling the gas containing arsenic, can be correspondingly smaller or of increased output capacity for a given size. On the other hand, the gas current from the second section of the furnace contains the sulphur dioxide in a highly concentrated state. It needs no cooling and can be treated in the hot condition for the production, for example, of sulphuric acid.

(3) The furnaces operated by the process of the present invention have very high throughput capacities because the heat generated in the furnace is more fully utilized and any surplus heat can be led away to better effect if desired.

(4) Inasmuch as no intermediate products which contain mixtures of the desired recoverable products in a form unsuitable for further treatment are obtained, the apparatus is simplified, thus lessening the risk of endangering the health of the operatives.

The same advantages result from the application of the present process to the other metallurgical operations hereinbefore mentioned.

I claim:

1. A process for the separate recovery of volatile substances from materials containing in solid form a plurality of volatile substances one of which is more readily volatile than the remainder which comprises charging the material into one end of a rotary tubular furnace, causing it to traverse said furnace progressively and in one direction, maintaining the temperature of the material in that part of the furnace adjacent the charging end thereof at the volatilization temperature of the more readily volatilizable substance, and withdrawing the so-volatilized substance from the furnace at the charging end of the latter, maintaining the temperature of the material in that part of the furnace which is remote from the charging end thereof at the volatilization temperature of a less readily volatilizable substance contained in said material, and withdrawing the so-volatilized substance at the end of the furnace remote from the charging end thereof.

2. Process as defined in claim 1, characterized in that a gas is introduced into the furnace and is withdrawn therefrom with the substance which is volatilized in that part of the furnace into which the gas is introduced.

3. Process as defined in claim 1, characterized in that a gas containing free oxygen is introduced into the furnace and is withdrawn therefrom with the substance which is volatilized in that part of the furnace into which the gas is introduced.

4. Process as defined in claim 1, characterized in that a gas containing a combustible material is introduced into the furnace and is withdrawn therefrom with the substance which is volatilized in that part of the furnace into which the gas is introduced.

5. Process as defined in claim 1, characterized in that a gas is introduced into that part of the furnace which is adjacent the charging end thereof, and in that the gas is withdrawn with a volatilized substance from said furnace at the charging end of the latter.

6. Process as defined in claim 1, characterized in that a gas is introduced into that part of the furnace which is remote from the charging end thereof, and in that the gas is withdrawn with a volatilized substance from said furnace at the end thereof remote from the charging end.

7. Process as defined in claim 1, characterized in that a gas is introduced into that part of the furnace which is adjacent the charging end and a gas is introduced into that part of the furnace which is remote from the charging end, and in that the gas which is introduced into that part of the furnace which is adjacent the charging end of the latter is withdrawn with volatilized substance from said furnace at the charging end of the latter while the gas which is introduced into that part of the furnace which is remote from the charging end of the latter is withdrawn with volatilized substance from said furnace at the end remote from the charging end.

8. Process as defined in claim 1, characterized in that a gas is introduced into that part of the furnace which is adjacent the charging end and a gas is introduced into that part of the furnace which is remote from the charging end, and in that the gas which is introduced into that part of the furnace which is adjacent the charging end of the latter is withdrawn with volatilized substance from said furnace at the charging end of the latter while the gas which is introduced into that part of the furnace which is remote from the charging end of the latter is withdrawn with volatilized substance from said furnace at the end remote from the charging end, one of said gases containing free oxygen.

9. Process as defined in claim 1, characterized in that a gas is introduced into that part of the furnace which is adjacent the charging end and a gas is introduced into that part of the furnace which is remote from the charging end, and in that the gas which is introduced into that part of the furnace which is adjacent the charging end of the latter is withdrawn with volatilized substance from said furnace at the charging end of the latter while the gas which is introduced into that part of the furnace which is remote from the charging end of the latter is withdrawn with volatilized substance from said furnace at the end remote from the charging end, one of said gases carrying a combustible material.

10. Process as defined in claim 1, characterized in that a volatile substance to be recovered from the material is a volatile metal.

11. Process as defined in claim 1, characterized in that a volatile substance to be recovered from the material is a volatile metal, and in that it is recovered in the form of a compound of said volatile metal.

12. Process as defined in claim 1, characterized in that the material so treated is an arsenical pyrites, and in that the arsenic content of said material is separated from the material at an initial stage of the treatment and is withdrawn from the furnace at that end of the latter which is adjacent the charging end, while the sulphur content is separated from the material at a later stage of the treatment and is withdrawn from the furnace at that end of the latter which is remote from the charging end thereof.

13. Rotary tube furnace for the separate recovery of volatile substances from materials containing a plurality of the desired recoverable substances in the solid form, comprising a furnace tube provided with inlets distributed over the periphery and length of the furnace, gas-tight heads with gas outlets at both ends of the furnace tube and means intermediate the ends of the tube for preventing the mingling of gases given off in one part of the furnace with gases given off in another part of the furnace.

14. Rotary tube furnace for the separate recovery of volatile substances from materials containing a plurality of the desired recoverable substances in the solid form, comprising a furnace tube provided with inlets distributed over the periphery and length of the furnace, gastight heads with gas outlets at both ends of the furnace tube and a restriction in the free cross-section of the furnace at the point where the currents of gas directed to the two ends of the furnace originate.

CARL PAUL DEBUCH.